(12) United States Patent
Bock et al.

(10) Patent No.: US 6,890,021 B2
(45) Date of Patent: May 10, 2005

(54) STRUCTURAL REINFORCEMENT SYSTEM HAVING MODULAR SEGMENTED CHARACTERISTICS

(75) Inventors: Lothar Josef Bock, Dryden, MI (US); Bendan Keenan, Auburn Hills, MI (US); Ken Takahashi, Bloomfield, MI (US)

(73) Assignee: L & L Products, Romeo, MI (US)

( * ) Notice: Subject to any disclaimer, the term of this patent is extended or adjusted under 35 U.S.C. 154(b) by 0 days.

(21) Appl. No.: 10/839,084

(22) Filed: May 5, 2004

(65) Prior Publication Data

US 2004/0207233 A1 Oct. 21, 2004

Related U.S. Application Data

(63) Continuation of application No. 10/236,315, filed on Sep. 6, 2002.
(60) Provisional application No. 60/324,497, filed on Sep. 24, 2001.

(51) Int. Cl.$^7$ .............................................. B60R 21/00
(52) U.S. Cl. ............................ 296/187.02; 296/187.12; 296/203.03; 52/726.1; 52/735.1
(58) Field of Search ....................... 296/187.02, 187.03, 296/187.12, 193.04, 193.05, 193.06, 203.03, 207, 209; 52/726.1, 731.6, 735.1, 309.7

(56) References Cited

U.S. PATENT DOCUMENTS

| | | |
|---|---|---|
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |

(Continued)

FOREIGN PATENT DOCUMENTS

| | | |
|---|---|---|
| DE | 19812288 C1 | 5/1999 |
| DE | 19856255 C1 | 1/2000 |

(Continued)

OTHER PUBLICATIONS

U.S. Appl. No. 09/631,211, filed Aug. 3, 2000.
Search Report dated Sep. 13, 2002, for Application No. GB 0211775.2.
International Search Report dated Jan. 30, 2003.
Born, Peter and Bernd Mayer, "Structural Bonding in Automotive Applications", AutoTechnology, Apr. 2004, pp. 44–47.

*Primary Examiner*—Patricia L. Engle
(74) *Attorney, Agent, or Firm*—Dobrusin & Thennisch PC

(57) ABSTRACT

A modular segmented structural reinforcement system for use with closed forms or cavities defined with automotive vehicles having a plurality of modular segments designed to be secured within a defined portion of an automotive vehicle applications. An expandable or bonding material, such as an epoxy-based reinforcing foam or other sound absorption, damping, vibration reduction, or sealing material is disposed on at least a portion of the outer surface of each of the plurality of segments. Once the system is flexible fitted within the closed form or placed within a selected cavity of an automotive vehicle, the material expands and cures during an automobile assembly operation, bonding the reinforcement system to the segments. As a result, the reinforcement system provides enhanced load distribution over the vehicle frame without adding excessive weight and further serves to reduce noise and vibrational characteristics of the automotive vehicle.

19 Claims, 5 Drawing Sheets

U.S. PATENT DOCUMENTS

| | | |
|---|---|---|
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |
| 4,984,406 A | 1/1991 | Friesen |
| 4,995,545 A | 2/1991 | Wycech |
| 5,124,186 A | 6/1992 | Wycech |
| 5,266,133 A | 11/1993 | Hanley et al. |
| 5,288,538 A | 2/1994 | Spears |
| 5,358,397 A | 10/1994 | Ligon et al. |
| 5,373,027 A | 12/1994 | Hanley et al. |
| 5,506,025 A | 4/1996 | Otto et al. |
| 5,575,526 A | 11/1996 | Wycech |
| 5,631,027 A | 5/1997 | Takabatake |
| 5,660,116 A | 8/1997 | Dannawi et al. |
| 5,725,272 A | 3/1998 | Jones |
| 5,755,486 A | 5/1998 | Wycech |
| 5,766,719 A | 6/1998 | Rimkus |
| 5,884,960 A | 3/1999 | Wycech |
| 5,888,600 A | 3/1999 | Wycech |
| 5,894,071 A | 4/1999 | Merz et al. |
| 5,932,680 A | 8/1999 | Heider |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,058,673 A | 5/2000 | Wycech |
| 6,059,342 A | 5/2000 | Karwai et al. |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,103,784 A | 8/2000 | Hilborn et al. |
| 6,131,897 A | 10/2000 | Barz et al. |
| 6,135,541 A | 10/2000 | Geise et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,207,244 B1 | 3/2001 | Hesch |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,267,436 B1 | 7/2001 | Takahara |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| 6,435,601 B2 * | 8/2002 | Takahara ............... 296/187.03 |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,494,525 B1 * | 12/2002 | Blank ................... 296/187.02 |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,729,425 B2 | 5/2004 | Schneider |
| 6,733,040 B1 | 5/2004 | Simboli |
| 6,748,667 B2 | 6/2004 | Sevastian |
| 6,777,049 B2 | 8/2004 | Sheldon et al. |
| 6,786,533 B2 | 9/2004 | Bock et al. |
| 6,820,923 B1 | 11/2004 | Bock |
| 2001/0020794 A1 | 9/2001 | Ishikawa |
| 2002/0033617 A1 | 3/2002 | Blank |
| 2002/0053179 A1 | 5/2002 | Wycech |
| 2002/0074827 A1 | 6/2002 | Fitzgerald et al. |
| 2002/0164450 A1 | 11/2002 | Lupini et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0069335 A1 | 4/2003 | Czaplicki et al. |
| 2004/0011282 A1 | 1/2004 | Myers et al. |
| 2004/0079478 A1 | 4/2004 | Merz |
| 2004/0135058 A1 | 7/2004 | Wycech |

FOREIGN PATENT DOCUMENTS

| | | |
|---|---|---|
| DE | 19858903 A1 | 6/2000 |
| EP | 0 414 302 A1 | 2/1991 |
| EP | 0611778 A3 | 8/1994 |
| EP | 0 679 501 A1 | 11/1995 |
| EP | 0891918 A1 | 1/1999 |
| EP | 0893331 A1 | 1/1999 |
| EP | 0893332 A1 | 1/1999 |
| EP | 0 697 956 B1 | 6/1999 |
| EP | 1 006 002 A2 | 6/2000 |
| EP | 1 122 156 A2 | 8/2001 |
| EP | 0893332 B1 | 3/2002 |
| EP | 1 006 022 B1 | 9/2003 |
| EP | 1 362 683 A2 | 11/2003 |
| EP | 1 362 769 A1 | 11/2003 |

| | | |
|---|---|---|
| EP | 1 428 744 | 6/2004 |
| EP | 1 440 867 A1 | 7/2004 |
| FR | 2 749 263 | 12/1997 |
| GB | 2 083 162 A | 3/1982 |
| GB | 2 375 328 A | 11/2002 |
| GB | 2 401 349 A | 11/2004 |
| JP | 10-53156 | 2/1998 |
| JP | 02001062833 A | 3/2001 |
| JP | 02001088739 A | 4/2001 |
| JP | 02001191949 A | 7/2001 |
| JP | 02001199362 A | 7/2001 |
| JP | 02002120250 A | 4/2002 |
| JP | 02002362412 A | 12/2002 |
| WO | WO95/32110 | 11/1995 |
| WO | WO97/02967 | 1/1997 |
| WO | WO97/43501 | 11/1997 |
| WO | WO98/50221 | 11/1998 |
| WO | WO99/08854 | 2/1999 |
| WO | WO99/28575 | 6/1999 |
| WO | WO99/48746 | 9/1999 |
| WO | WO99/50057 | 10/1999 |
| WO | WO00/12571 | 3/2000 |
| WO | WO00/12595 | 3/2000 |
| WO | WO00/13876 | 3/2000 |
| WO | WO00/13958 | 3/2000 |
| WO | WO00/20483 | 4/2000 |
| WO | WO 00/27920 | 5/2000 |
| WO | WO00/37302 | 6/2000 |
| WO | WO00/37554 | 6/2000 |
| WO | WO00/39232 | 7/2000 |
| WO | WO00/40629 | 7/2000 |
| WO | WO00/40815 | 7/2000 |
| WO | WO00/43254 | 7/2000 |
| WO | WO00/52086 | 9/2000 |
| WO | WO00/55444 | 9/2000 |
| WO | WO00/46461 | 8/2001 |
| WO | WO01/54936 | 8/2001 |
| WO | WO01/56845 | 8/2001 |
| WO | WO01/71225 | 9/2001 |
| WO | WO01/83206 | 11/2001 |
| WO | WO01/88033 | 11/2001 |
| WO | WO 03/042024 A1 | 5/2003 |
| WO | WO 03/051676 | 6/2003 |

\* cited by examiner

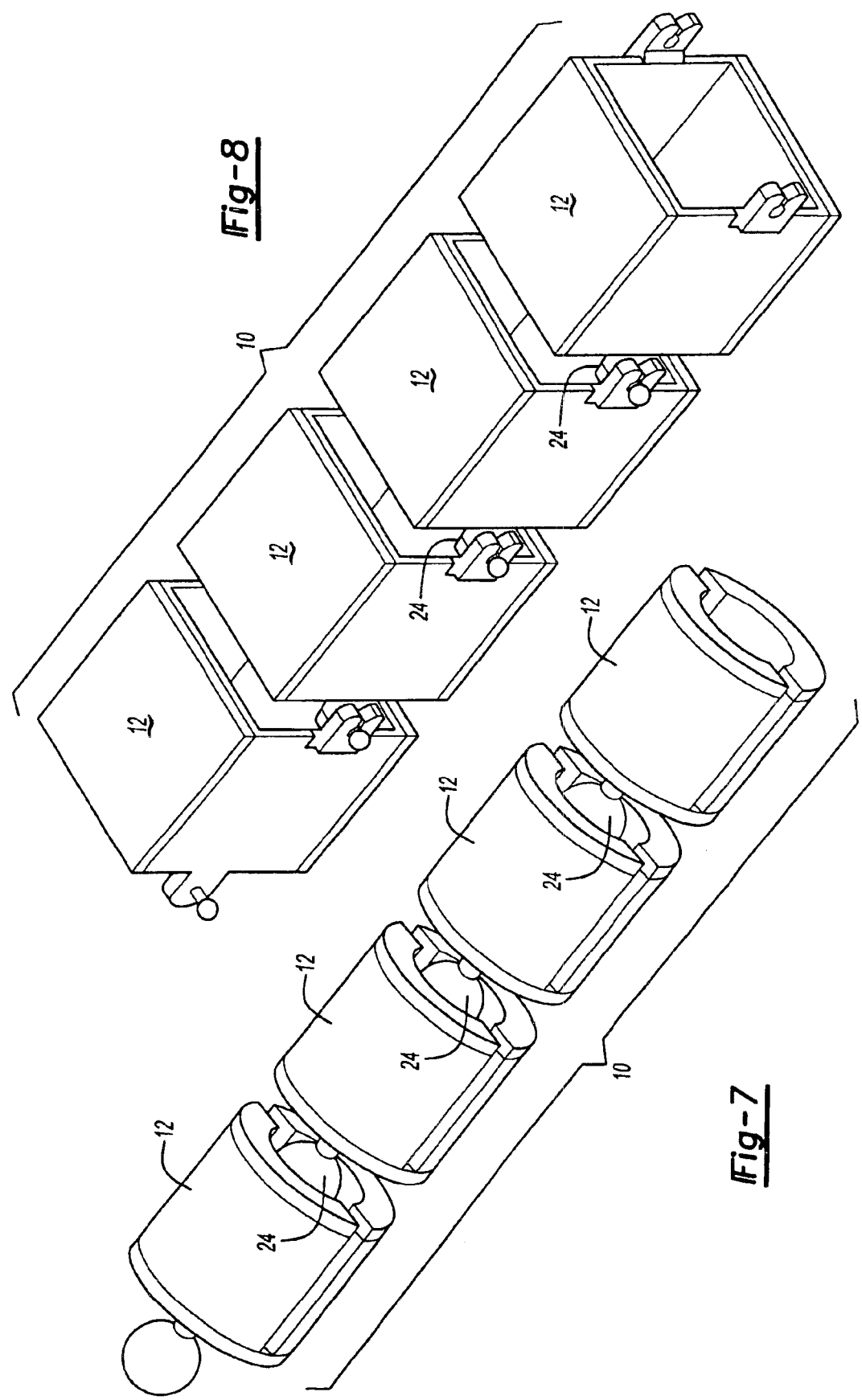

STRUCTURAL REINFORCEMENT SYSTEM HAVING MODULAR SEGMENTED CHARACTERISTICS

FIELD OF THE INVENTION

The present invention relates generally to a structural reinforcement system for use in increasing the stiffness, strength, durability, sealing, and sound absorption/damping of different portions of a variety of goods and products, such as furniture, commercial, industrial, and household appliances, as well as land transportation vehicles, such as automotive, aerospace, marine, and rail vehicles. More particularly, the present invention relates to segmented or modularly expandable structurally reinforced closed forms, such as a hydroform structure or hydroform rail, which utilizes a plurality of segmented parts suitable for flexible attachment and capable of providing a unitary structure for reinforcement of a desired area. Once attached as a whole, the segmented portions maintain flexibility for movement and application into specific closed form shapes while the exterior surface of each individual segment or module can be coated with a material selected from a group consisting of a sealing material, or sound damping material, an anti-vibration material, a structurally reinforcing material, or other expandable and foamable material to cross-link, structurally adhere, and reinforce the form when the material becomes chemically active and expands upon heating, self-heating, or is otherwise exposed to a heat or energy source.

BACKGROUND OF THE INVENTION

Traditionally, closed form or hydroforming techniques are used to draw and shape metal tubes. Conventional hydroforming techniques often involve two steps: (1) placing the desired bends in the tube and (2) forming the tube to the desired configuration. The second step of this process usually requires placing a tubular member having an open bore in a mold and pinching off the ends of the tube. A pressurized liquid is then injected into the open bore, causing the tube to stretch and expand out against the mold.

The manufacturing advantages of the hydroforming process is that it allows formation of relatively long tubular structures having a seamless perimeter. This process eliminates the cost of welding, machining, or fastening operations often used to shape the part in the desired configuration. As a result, a hydroform or closed form structure very often has a high length to diameter ratio. For instance, a hydroform structure may have a length in excess of 15' and a diameter ranging from approximately ¾" to more than 12". To this end, a further manufacturing process advantage of a hydroform structure is that it can exceed the length of other tubular members, such as torsion bars or tubular bars, formed using other processes.

Additionally, hydroforming processing creates complex structural shapes that typically include bends and contour changes. Often the number of bends and contour changes in a hydroformed bar are greater and more complex than those found in torsion bars or other tubular structures formed using different techniques. These shapes often have particular application in land transportation vehicles which require contour changes to reflect vehicle styling and traditional automotive architecture in the form of automotive rails, pillars, and other structural members.

In addition, hydroform structures typically have a constant wall thickness prior to forming, and might develop strength differences at the site of bends or changes in contour, as well as at certain locations along a long tubular section. Thus, it is often desirable to reinforce closed form and hydroform sections to improve their structural stiffness, strength, and durability, particularly in automotive vehicle applications.

Traditional ways of reinforcing tubular structures such as hydroforms and other closed forms include sliding a metal sleeve inside the tube and welding the reinforcing member in place. However, because the hydroform often includes one or more shapes or bends, or one or more changes in contour and/or diameter, it is often difficult to insert the sleeve into the hydroform at the precise location of the weak portion. Other techniques include reinforcing the hydroform from the outside by welding the sleeve onto the outside of the hydroform. However, hydroforms are often used in applications having very close tolerances, resulting in little or no clearance for an externally placed reinforcing member. Accordingly, exterior reinforcements are often not as effective as interior reinforcements.

Additionally, in many operations the weight of the tubular member is critical and must be kept low as possible. Thus, the use of an external sleeve adds unwanted weight to the tubular assembly. Still further, the welding operation tends to be labor intensive during the manufacturing process, time consuming and inexact, increasing the cost of forming the hydroform member and producing parts that have questionable reliability. Finally, these additional manufacturing steps and operations are often cumbersome and difficult to integrate into a final vehicle manufacturing process in that additional tooling would need to be developed by the manufacturer and assembly plant resources, labor, maintenance, and space would need to be dedicated and expensed by the vehicle manufacturer.

Accordingly, there is a need in industry and manufacturing operations for system, device, and method for reinforcing the weak areas of closed forms and other hydroform tubes, such as a hydroform rail, without significantly increasing the weight and manufacturing complexity. In particular, there is a need for reinforcing a closed form or hydroform, which utilizes a plurality of segments or portions to achieve integrated reinforcement within the closed form since the contour or shape of typical tubes do not allow for placement of single piece reinforcement members. In this regard, the present invention addresses and overcomes the shortcomings found in the prior art by providing a multi-segment reinforcement system having at least two segments or portions capable of being modularly attached or otherwise engaged in segments within a hydroform that may then be fixed in location through the use of a third segment or portion which serves as a locking, positioning, and retaining member of the reinforcement system within the hydroform or other closed form. However, the plurality of modularly attached segments could also be locked, positioned, and retained within a hydroform through the use of retention means, such as a string, wire, or chain looped through each of the segments which provides enough tension to retain each of the segments in a desired position while the entire system (i.e. the segments with an amount of bonding material disposed along at least a portion of each of the segments) is exposed and cured by the heat typically encountered in an automotive painting operation. Structural reinforcement of the hydroform is achieved through activation by heat of the bonding material disposed along at least a portion of an outer or exterior surface of the plurality of segments or portions, such a material would typically expand when exposed to heat or other energy source and in doing so structurally adhere the segments or portions to each other and the hydroform. Further, it is contemplated that the system would have greater flexibility to a range of applications by allowing each segment or portion of the plurality of segments to also have the capability of receiving a suitable amount of sealing material, sound absorption material, and/or an expandable material, or a combination thereof.

SUMMARY OF THE INVENTION

The present invention relates to methods and systems for reinforcing a closed form or hydroform member. In one embodiment, the system includes a plurality of segments having a bonding material disposed over at least a portion of the exterior or outer surface of the segments which may or may not be expandable upon exposure to heat or other energy source. The selected bonding material extends along at least a portion of the exterior surface of at least one segment which are then configured for placement within a portion of a automotive vehicle to be reinforced.

In a particular preferred embodiment, the bonding material consists of an expandable material which is generally and preferably a heat-activated epoxy-based resin having foamable characteristics upon activation through the use of heat typically encountered in an e-coat process, paint oven, or other automotive painting operation. As the material is heated or otherwise exposed to an energy source in the manufacturing environment, it expands, cross-links, and structurally adheres to adjacent surfaces. Preferred structural foam or expandable materials are commercially available from L&L Products, Inc. of Romeo, Mich. under the designation L5204, L5206, L5207, L5208, or L5209. Generally speaking, these automotive vehicle applications may utilize technology and processes such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000, Ser. No. 09/524,961 filed Mar. 14, 2000, and particularly, 09/459,756 filed Dec. 10, 1999, all of which are expressly incorporated by reference.

The system generally employs two or more segments or portions defined adapted for stiffening the structure to be reinforced and helping to redirect applied loads. In use, the segments are inserted into a closed form, such as a hydroformed tube, or simply placed or retained in a cavity by retention means defined within portions of an automotive vehicle such as a pillar, rail, rocker, door assembly, or other frame member, with the heat activated bonding material serving as the load transferring and potentially energy absorbing medium. In a particularly preferred embodiment, at least two of the segments are composed of a polymeric material, such as nylon, an injection molded nylon carrier, an injection molded polymer, graphite, carbon, or a molded metal (such as aluminum, magnesium, and titanium, an alloy derived from the metals or a metallic foam derived from these metals or other metal foam) and is at least partially coated with a bonding material on at least one of its sides, and in some instances on four or more sides. A preferred bonding material is an epoxy-based resin, such as L5204, L5206, L5207, L5208 or L5209 structural foam commercially available from L & L Products, Inc. of Romeo, Mich. However, the present invention may further comprise retention means in an alternative form consisting of a third member, segment, or portion which serves to lock and position the at least first two segments in place. This retention means could also utilize an adhesive material disposed along an outer surface of each of the members, segments, or portions. Still further, the retention means, which serves to lock, position, and retain the plurality of members or segments within the hydroform could also comprise locking means, such as a string, wire, or chain looped through each of the segments which provides enough tension to retain the plurality of segments in a desired position while the bonding material is activated in the e-coat or painting operation. Once the bonding material is activated and cured, it is contemplated that the bonding material will structurally secure and retain the plurality of segments in the desired position within the portion of the vehicle to be reinforced.

In addition, it is contemplated that the plurality of segments could comprise a nylon or other polymeric material as set forth in commonly owned U.S. Pat. No. 6,103,341, expressly incorporated by reference herein. Still further, the segments adapted for stiffening the structure to be reinforced could comprise a stamped and formed cold-rolled steel, a stamped and formed high strength low alloy steel, a stamped and formed transformation induced plasticity (TRIP) steel, a roll formed cold rolled steel, a roll formed high strength low alloy steel, or a roll formed transformation induced plasticity (TRIP) steel, as well as an elastomer, polyethylene, ethylene-vinyl acetate copolymer, plasticized polyvinyl chloride film, polyamide, polysulfone, or various olfenic copolymer and terpolymer materials. Although the bonding material of the present invention does not need to be either heat-activatable or expandable, a preferred material used in the present invention is an expandable structural material. The choice of the material selected as the bonding material will be dictated by performance requirements and economics of a specific application.

Additional bonding materials that could be utilized in the present invention include other materials which are suitable as acoustic media (i.e. sound absorbing, sound damping, or impacting NVH characteristics) and which may be heat activated which generally activate and expand to fill a desired cavity or occupy a desired space or function when exposed to temperatures typically encountered in automotive e-coat curing ovens and other paint operations ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, Inc. of Romeo, Mich., under the designations as L-2105, L-2100, L-7005 or L-2018, L-7101, L-7102, L-2411, L-2420, L4141, etc. and may comprise either open or closed cell polymeric base material.

Further, it is contemplated that the plurality of segments or portions of the present invention could employ a suitable amount of sealing, sound dampening, structural reinforcement, or acoustic material in combination upon different surfaces of the plurality of segments within the selected area to be reinforced to achieve specific points of reinforcement, sealing, and/or sound damping depending upon the individual needs or desirability of the specific application. When activated through the application of heat, it is contemplated that a segment specific material will achieve not only structural reinforcement, but may also assist in the reduction of vibration and noise in the overall automotive body depending upon the characteristics of the chosen bonding material. In this regard, the now reinforced area, closed form, or hydroform will have increased stiffness in the cross-members, which will shift the natural frequency, measured in hertz that resonates through the automotive chassis and will reduce acoustic transmission and the ability to block or absorb noise through the use of the conjunctive acoustic, sealing, or sound damping product. By increasing the stiffness and rigidity of the cross-members, the noise and frequency of the overall engine ride vibration that occurs from the operation of the vehicle can be reduced since a shift in frequency of noise and vibration will allow resonance through the chassis. Although the use of such sealing, damping, and vibration reducing materials or media can be utilized instead of, or in conjunction with, the structural expandable material on the individual segments of the present invention, the preferred embodiment of the structural reinforcement system of the present invention utilizes a bonding material consisting of a structurally reinforcing expandable material. Use of acoustic materials in conjunction with structural may provide additional structural improvement but primarily would be incorporated to improve NVH characteristics.

It is also contemplated that the material of the present invention could be delivered and placed into contact with the segments through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material is at least partially coated with heat-activated material that could be structural, sealing, dampening, or acoustic in nature. This preferably heat activated material can be snap-fit onto the chosen surface or substrate; placed into beads or pellets for placement along the chosen substrate or member by means of extrusion, placed along the substrate through the use of baffle technology, die-cut according to teachings that are well known in the art, utilize pumpable application systems which could include the use of a baffle and bladder system, as well as sprayable applications.

In another embodiment, the plurality of segments are composed of an injection molded nylon and provided with a suitable amount of bonding material or load transfer medium molded onto its sides in at least one location defining a portion wherein each portion is smaller in diameter than a corresponding insertable opening in the form or tube to enable placement within a cavity defined within an automotive vehicle, such as portions of a hydroform tube, hydroform rail, or other area or substrate found in an automotive vehicle which could benefit from the structural reinforcement characteristics found in the present invention. In this embodiment a plurality of modularly attachable segments or portions are utilized to provide an integrated member, having flexible characteristics relative to one another similar to the movements of an accordian, for installation within a hydrofromed rail or other area of a vehicle that would benefit from structural reinforcement. For example, a first segment or portion corresponds to, and is insertably attached to an opening located within the hydroform tube or hydrofrom rail section. A second segment or portion is modularly attachable or slideably engaged and affixed to a surface of the first segment or portion. A third segment or portion, and a plurality of portions thereafter, is then modularly attached or slideably engaged and affixed to a surface of the preceding plurality of segments. It is contemplated that the modularly attached or slideably engaged plurality of segments will still provide a certain degree of freedom or flexibility whereby the plurality of segments can flex and be shaped to fit within the contours or geometric requirements of the area to be structurally reinforced. A fixed locking member or retention means, such as a heal and toe feature, is then utilized to place or fix the plurality of segments or portions together within the area to be reinforced thereby retaining the segments. Further, the locking member could comprise tension means, such as a string, wire, chain, or cable retaining the plurality of segments with the bonding material on the exterior surface of the segments in a desired position while the system undergoes baking in an automotive painting operation. The bonding material is activated to accomplish expansion through the application of heat typically encountered in an automotive e-coat oven or other painting operation oven in the space defined between the plurality of segments or portions and the walls of the cavity selected for reinforcement. The resulting structure includes the wall structure of the hydroform tube or cavity joined to the plurality of segments with the aid of the now activated bonding material. It is contemplated that each individual segment or portion could be configured for application of a bonding material, expandable material, or sealing material applied in a variety of patterns, shapes, and thicknesses to accommodate the particular size, shape, and dimensions of the cavity corresponding to the chosen form or vehicle application.

BRIEF DESCRIPTION OF THE DRAWINGS

The features and inventive aspects of the present invention will become more apparent upon reading the following detailed description, claims and drawings, of which the following is a brief description:

FIG. 7 is a perspective view of a an alternative embodiment of the modular segmented structural reinforcement system in accordance with the teachings of the present invention showing a plurality of modular segments held together by attachment means comprising a traditional ball and socket assembly which permits the flexing of at least one modular segment relative to one another for placement in either a hydroform or directly to portions of an automotive vehicle.

FIG. 8 is a perspective view of a an alternative embodiment of the modular segmented structural reinforcement system in accordance with the teachings of the present invention showing a plurality of modular segments held together by attachment means comprising a hitch snap assembly which permits the flexing of at least one modular segment relative to one another for placement in either a hydroform or directly to portions of an automotive vehicle.

DESCRIPTION OF THE PREFERRED EMBODIMENT

Figure 1:
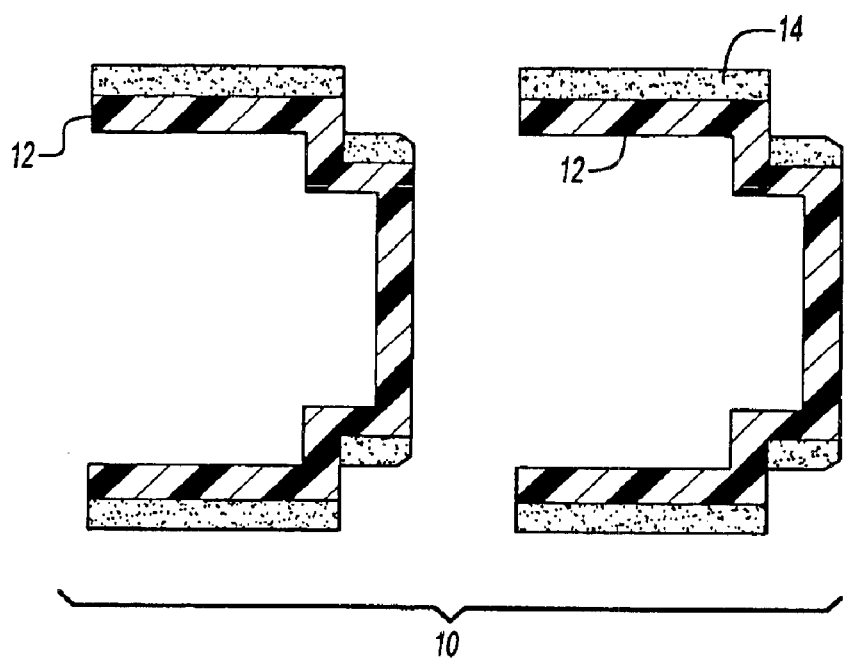
FIG. 1 is a perspective view of a modular segmented structural reinforcement system in accordance with the teachings of the present invention.

FIG. 1 shows a modular segmented reinforcement system 10 formed in accordance with the teachings of the present invention. The modular segmented reinforcement system 10 may impart increased strength, stiffness, sealing, sound absorption, or durability to a structural member or other portion of an automotive vehicle, and, thus, may be used in a variety of applications for different products. For instance, the modular segmented reinforcement system 10 may be used as part of the frame or rail system for automobiles and building structures. Other applications of the system 10 include furniture items, appliances, and aerospace, marine, rail, and automotive vehicles.

Figure 2:
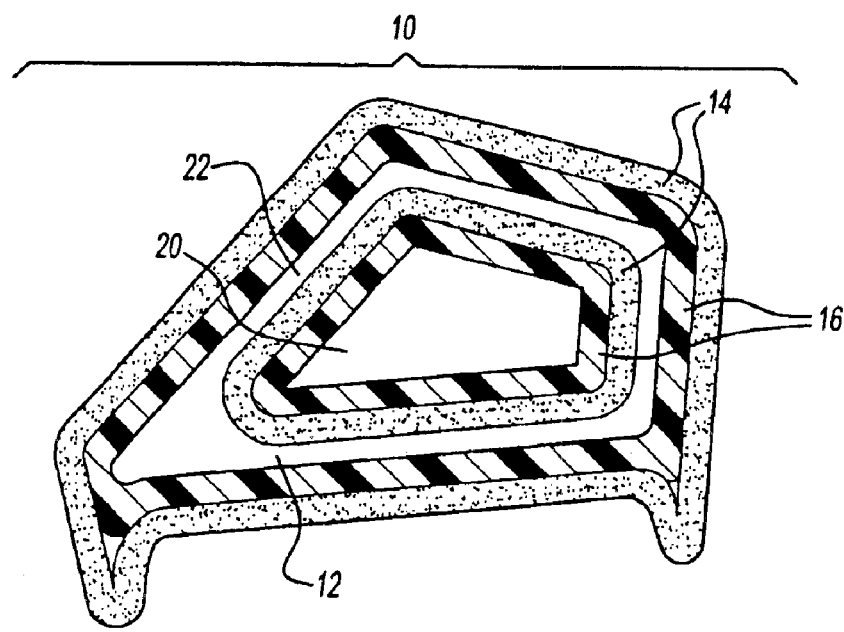
FIG. 2 is an exploded section view of a portion of a hydroform described in FIG. 1, showing the position of the plurality of modular segments and the expandable material in the uncured state.
Figure 3:
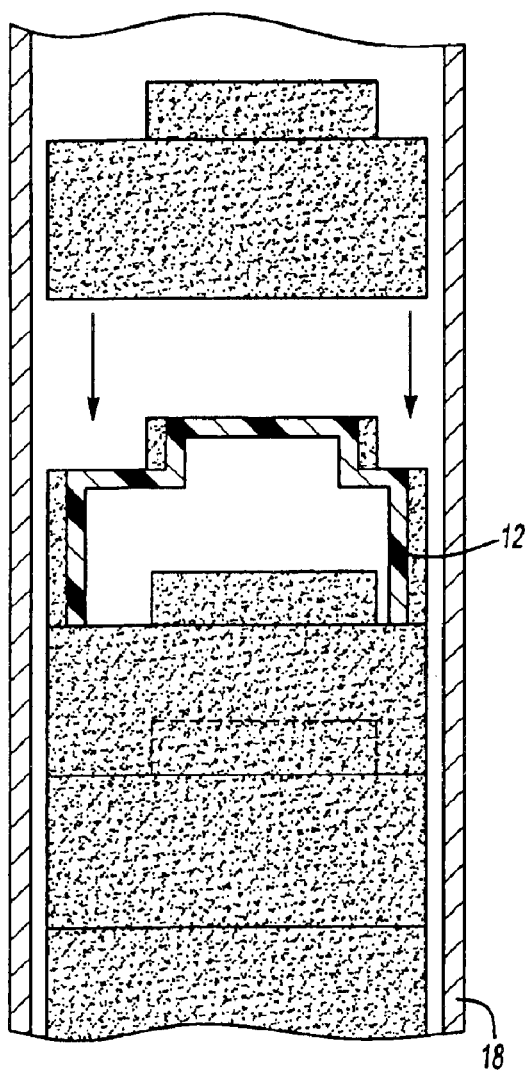
FIG. 3 is a cutaway sectional view of a modular segmented structural reinforcement system in accordance with the teachings of the present invention placed within a hydroform in accordance with the teachings of the present invention prior to activation of the expandable material.
Figure 4:
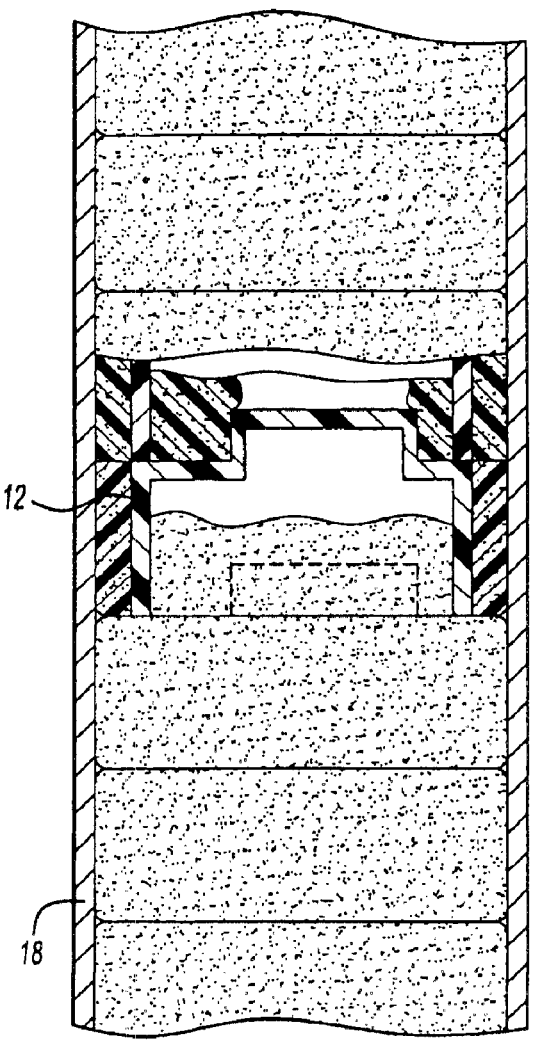
FIG. 4 is a cutaway sectional view of a modular segmented structural reinforcement system in accordance with the teachings of the present invention placed within a hydroform in accordance with the teachings of the present invention after activation of the expandable material.
Figure 5:
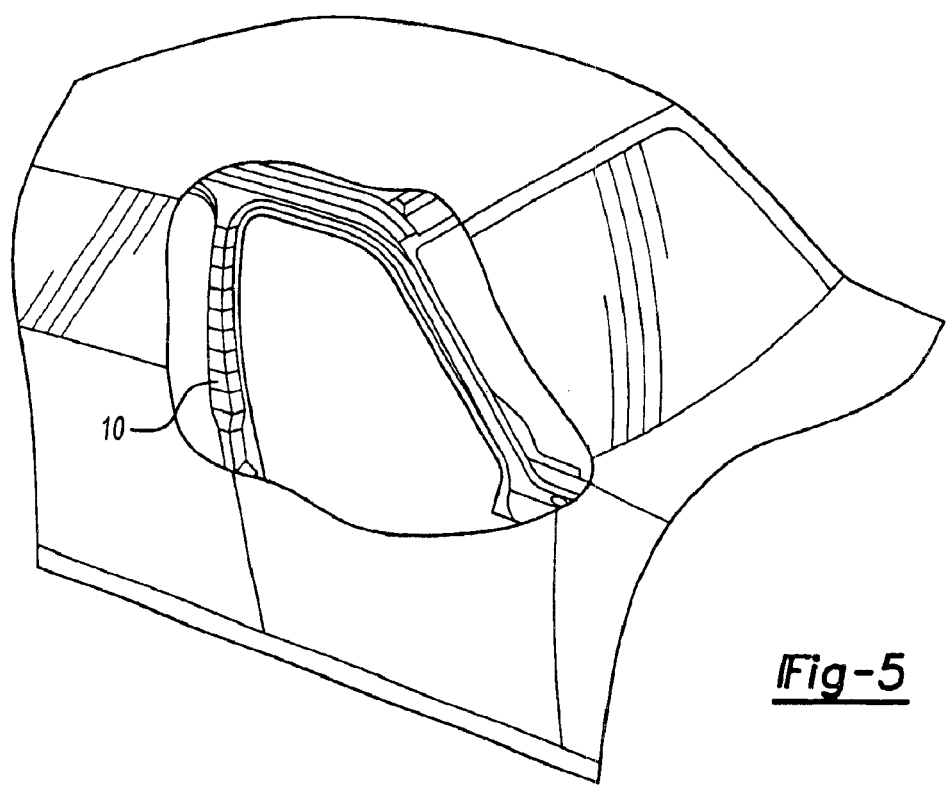
FIG. 5 is a cutaway sectional view of an alternative embodiment of the modular segmented structural reinforcement system placed within automotive vehicle pillar without the use of a hydroform in accordance with the teachings of the present invention

In a preferred embodiment, as in FIG. 2, the present invention comprises at least two segments 12 composed of an injection molded polymer. The segments 12 are provided with a suitable amount of a bonding material 14 molded or disposed along the exterior surface or sides of the segments 12 thereby defining a plurality of segmented portions 16 wherein each portion 16 is smaller in diameter than a corresponding insertable opening in the form or tube 18. The segments 12 are modular and are capable of being shaped and sized to fit a variety of closed form applications, such as a hydroform rail. However, it is contemplated that the segments 12 can be of any geometric size, shape, and dimension corresponding to the selected area to be reinforced or damped. The plurality of segments 12 are suitable for placement within a cavity defined within an automotive vehicle, such as portions of a hydrofrom frame rail, tube section, pillar, rocker, gate, or other area or substrate found in an automotive vehicle which could benefit from the structural reinforcement characteristics found in the present invention. In this embodiment, a first modular segment or portion 20 corresponds to, and is insertably attached to an opening located within a hydroform rail section or other area to be structurally reinforced, such as a cavity found in an automotive vehicle. A second modular segment or portion 22 is slideably engaged and affixed to a portion of the first modular segment 20. The present invention provides for a plurality of successive modular segments or portions that can be slideably engaged and affixed to one another thereby forming a unitary reinforcement system for placement within the hydroform rail or tube 18 or other cavity selected for structural reinforcement. It is contemplated that the plurality of modular segments or portions is both flexible and shapeable to the contour and shape of the desired closed form or hydroform, as well as the geometric configuration of other areas selected for reinforcement. In other words, it is contemplated that each of the plurality of segments 12 are flexible relative to each other so that the system 10 can be substantially formed to follow the contours of the tube 18 or other chosen portion of an automotive vehicle with or without the use of a tube 18. Accordingly, once a first modular segment or portion 20, consisting of a segment with the bonding material 14 placed along the segment, is positioned and slideably engaged with a second modular segment or portion 22, the now unitary first 20 and second 22 modular segments or portions provide a degree of movement or flexibility relative to one another thereby providing reinforcement along the contours and specific shape of the hydroform which cannot be achieved through injection molding, sheet metal applications, or other processes disclosed in the prior art. A locking or retaining member 24, which can comprise an additional segment, portion, or retention means or assembly, is then utilized to fixedly bridge the at least first 20 and second 22 segments or portions together. Although a ball and socket feature well known in the art is shown as the locking member or means in FIG. 7, it is contemplated that locking member 24 could be shaped and configured to position and retain any number of a plurality of segments or portions and that the present invention simply discloses at least two segments or portions for illustrative purposes only and should not be limited to the number of modular segments and corresponding flexible shapes that may be desirable in a variety of applications. In addition, the locking member or retention means 24 could comprise a traditional string, wire, or cable looped or tied through each of the plurality of modular segments thereby retaining the modular segments in a desired position or simply to achieve retention of the segments 12 or portions 16 in a flexible or accordion-like state whereby each segment 12 or portion 16 could move relative to each other for placement within a defined shape or cavity of an automotive vehicle which does not utilize a tube or form, as shown in FIGS. 6–9. In this regard, the bonding material 14 disposed along the exterior surface or sides of the segments 12, once activated to accomplish expansion through the application of heat typically encountered in an automotive e-coat oven or other heating operation, positions and locks the plurality of segments in space along the walls of the tube or portion of the automotive vehicle defining the cavity. The resulting structure may include the wall structure joined to the plurality of segments with the aid of the activated material 14.

It is contemplated that the material 14 could be applied to the exterior surface or sides of each of the plurality of modular segments in a variety of patterns, shapes, and thicknesses to accommodate the particular size, shape, and dimensions of the cavity corresponding to the chosen form or vehicle application. In addition, each of the plurality of segments could provide a versatile function depending upon the chosen hydroform application. For example, the bonding material 14 could comprise a sealing material, a sound absorption material, a damping material, or a structural reinforcement material. These different variations of the bonding material 14 could be placed alone or in combination on different segments or different portions of segments to achieve a desired localized result along the tube 18, such as localized structural reinforcement, localized sealing, and/or localized sound damping. The material 14 is activated to accomplish expansion through the application of heat typically encountered in an automotive e-coat oven or other heating operation in the space defined between the plurality of segments and the walls of the hydroform tube or the portion of the vehicle defining the cavity. The resulting structure includes the wall structure of the hydroform tube or cavity joined to the plurality of segments with the aid of the chosen material 14.

In one embodiment, at least two of the modular segments and, as shown, the first 20 and second 22 segments are nested together within the hydroform tube 18 with each having an application of the bonding material 14. A locking member 24, which is suitable for receiving an amount of bonding material 14 along one or more of its exterior or outer surfaces, is then either placed into contact with the first 20 and second 22 segments or insertably engaged through the hydroform tube 18 to serve as a locking and positioning member of the reinforcement system. Structural reinforcement of the hydroform tube 18 is achieved through activation by heat or some other activation stimulus or source of energy applied to the material 14 disposed along at least the first 20 and second 22 modular segments wherein the material 14 may expand and will structurally adhere the at least two modular segments 20 and 22, and the locking member 24 to each other and the hydroform tube 18.

In a preferred embodiment, it is contemplated that the bonding material 14 comprises a structural foam, which is more preferably heat-activated and expands and cures upon heating, typically accomplished by gas release foaming coupled with a cross-linking chemical reaction. This structural foam is generally applied to the segments 12 in a solid or semi-solid state. The structural foam may be applied to the outer surface of the segments 12 in a fluid state using commonly known manufacturing techniques, wherein the structural foam is heated to a temperature that permits the structural foam to flow slightly to aid in substrate wetting. Upon curing the structural foam hardens and adheres to the outer surface of the segment 12. Alternatively, the structural foam may be applied to the segments 12 as precast pellets, which are heated slightly to permit the pellets to bond to the outer surface of the segments 12. At this stage, the structural foam is heated just enough to cause the structural foam to flow slightly, but not enough to cause the structural foam to thermally expand. Additionally, the structural foam may also be applied by heat bonding/thermoforming or by co-extrusion. Note that other stimuli activated materials capable of bonding can be used, such as, without limitation, an encapsulated mixture of materials that, when activated by temperature, pressure, chemically, or other by other ambient conditions, will become chemically active. To this end, one aspect of the present invention is to facilitate a streamlined manufacturing process whereby the bonding material 14 can be placed along the segments 12 in a desired configuration and inserted within the closed form or hydroform at a point before final assembly of the vehicle.

The bonding material 14 that may have foamable characteristics is generally an epoxy-based material, but may include an ethylene copolymer or terpolymer, such as with an alpha-olefin. As a copolymer or terpolymer, the molecule is composed of two or three different monomers, i.e., small molecules with high chemical reactivity that are capable of linking up with similar molecules. A number of epoxy-based structural reinforcing foams are known in the art and may also be used to produce the bonding material 14 of the present invention. A typical structural foam includes a polymeric base material, such as an epoxy resin or ethylene-based polymer which, when compounded with appropriate ingredients (typically a blowing agent and perhaps a curing agent and filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the structural foam is usually initially processed as a thermoplastic material before curing. After curing, the structural foam typically becomes a thermoset material that is fixed and incapable of flowing.

An example of a preferred structural foam formulation is an epoxy-based material that may include polymer modificis such as an ethylene copolymer or terpolymer that is commercially available from L&L Products, Inc. of Romeo, Mich., under the designations L5206, L5207, L5208 and L5209. One advantage of the preferred structural foam materials over prior art materials is the preferred materials can be processed in several ways. Possible processing techniques for the preferred materials include injection molding, extrusion or extrusion with a mini-applicator extruder. This enables the creation of part designs that exceed the capability of most prior art materials.

While the preferred materials for fabricating the bonding material 14 have been disclosed, the material 14 can be formed of other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in commonly-assigned U.S. Pat. No. 6,131,897 for Structural Reinforcements, which is incorporated herein by reference. Some other possible materials include, but are not limited to, polyolefin materials, copolymers and terpolymers with at least one monomer type an alpha-olefin, phenol/formaldehyde materials, phenoxy materials, polyurethane materials with high glass transition temperatures, and mixtures or composites that may include even metallic foams such as an aluminum foam composition. See also, U.S. Pat. Nos. 5,766,719; 5,755,486; 5,575, 526; 5,932,680 (incorporated herein by reference). In general, the desired characteristics of the medium 14 include high stiffness, high strength, high glass transition temperature (typically greater than 70 degrees Celsius), and good adhesion retention, particularly in the presence of corrosive or high humidity environments. Still further, it is contemplated that the material 14 of the present invention could comprise a sealant, sound absorption material, or a damping material used alone, or in combination with, a structural foam disposed along the plurality of segments or portions of the plurality of segments to effectuate localized structural reinforcement, sealing, and/or sound absorption along specific chosen zones of the tube 18.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be active at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, blowing agents activators can be incorporated into the composition to cause expansion at different temperatures outside the above ranges.

Generally, prior art expandable acoustic foams have a range of expansion ranging from approximately 100 to over 1000 percent. The level of expansion of the bonding medium 14 may be increased to as high as 1500 percent or more, but is typically between 0% and 300%. In general, higher expansion will produce materials with lower strength and stiffness.

The modular segmented reinforcement system 10 disclosed in the present invention may be used in a variety of applications where structural reinforcement is desired. The modular segmented system 10 has particular application in those instances where the overall weight of the structure being reinforced is a critical factor. For instance, the system 10 may be used to increase the structural strength of aircraft frames, marine vehicles, automobile frames, building structures or other similar objects. In the preferred embodiment disclosed, the system 10 is used as part of an automobile frame to reinforce selected areas of the automobile frame or rails, and may also be utilized in conjunction with rockers, cross-members, chassis engine cradles, radiator/rad supports, and door impact bars in automotive vehicles with or without the use of a hydroform.

Figure 6:
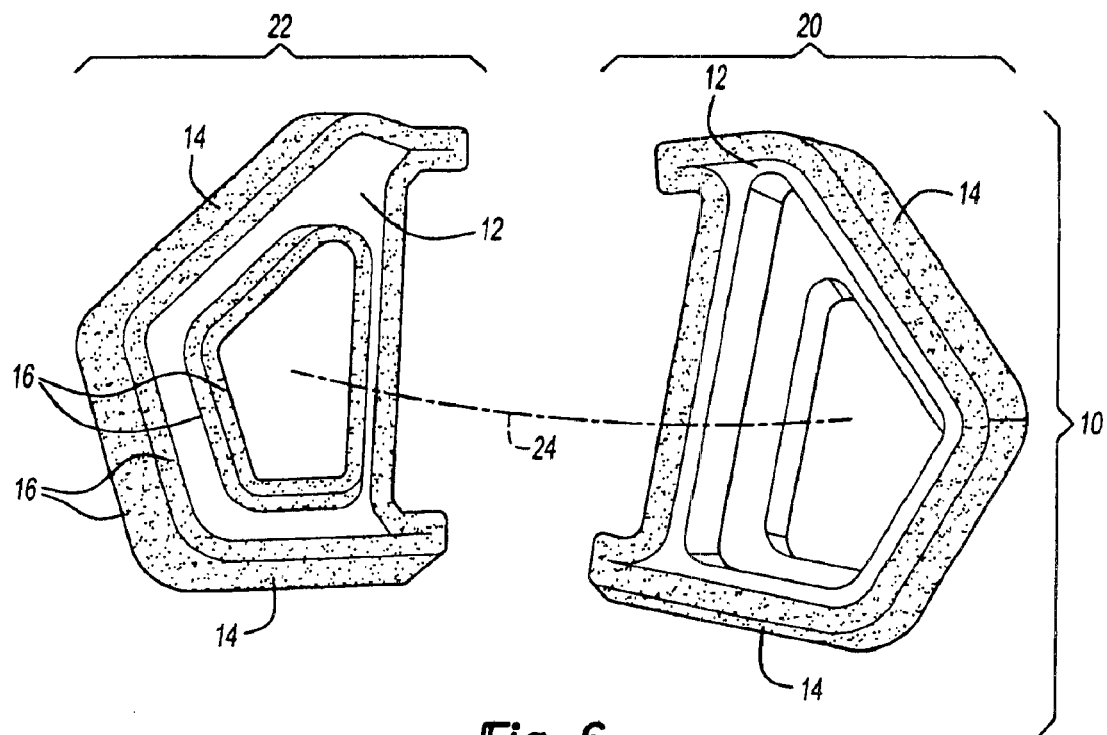
FIG. 6 is a partial perspective view of an alternative embodiment of the modular segmented structural reinforcement system in accordance with the teachings of the present invention showing a plurality of modular segments held together by attachment means which permit the flexing of at least one modular segment relative to one another for placement in either a hydroform or directly to portions of an automotive vehicle.

The system 10 is suitable for placement within a vehicle pillar, rail, rocker, or frame portion of an automobile frame assembly. At least two segments 12, and preferably a plurality of segments shaped to the contour of the chosen cavity or space defined in the automotive vehicle, are composed of an injection molded polymer (or other material (e.g., metal) or composite) provided with a suitable amount of a load transfer or bonding material 14 molded or disposed along the exterior surface or sides of the segments 12 thereby defining a plurality of portions 16 suitable for placement within a cavity defined within an automotive vehicle, such as portions of a hydroform tube section or other area or substrate found in an automotive vehicle which could benefit from the structural reinforcement characteristics found in the present invention. In this embodiment, it will be appreciated that the system 10 of the present invention may be used to reinforce other areas of an automobile frame or rocker assembly and the number of segments 12 and placement of the bonding material 14 along the segments 12 would be dictated by the shape and desired application. As shown in FIG. 6, it is contemplated that the members would be flexible nested together by use of the locking or retention means 24 such as a string, clip, chain, cable, ball and socket assembly, or hitch-snap assembly which retains the segments 12 but still allows flexible movement relative to one another whereby a predetermined number of segments 12 can be utilized and shaped to fit within a defined shape and placement of an automotive vehicle application to provide structural reinforcement of the application after activation of the bonding material 14.

Though other heat activated materials are possible, a preferred bonding material 14 is an expandable polymeric material, and preferably one that is foamable. A particularly preferred material is an epoxy-based structural foam. For example, without limitation, in one embodiment, the structural foam is an epoxy-based material that may include an ethylene copolymer or terpolymer. A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively high glass transition point, and good environmental degradation resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the material 14 is provided in an encapsulated or partially encapsulated form, which may comprise a pellet, which includes an expandable foamable material, encapsulated or partially encapsulated in an adhesive shell, which could then be attached to the members 12 in a desired configuration. An example of one such system is disclosed in commonly owned U.S. Pat. No. 6,422,575 for an Expandable Pre-Formed Plug, hereby incorporated by reference. In addition, as discussed previously, preformed patterns may also be employed such as those made by extruding a sheet (having a flat or contoured surface) and then die cutting it according to a predetermined configuration.

Figure 9:
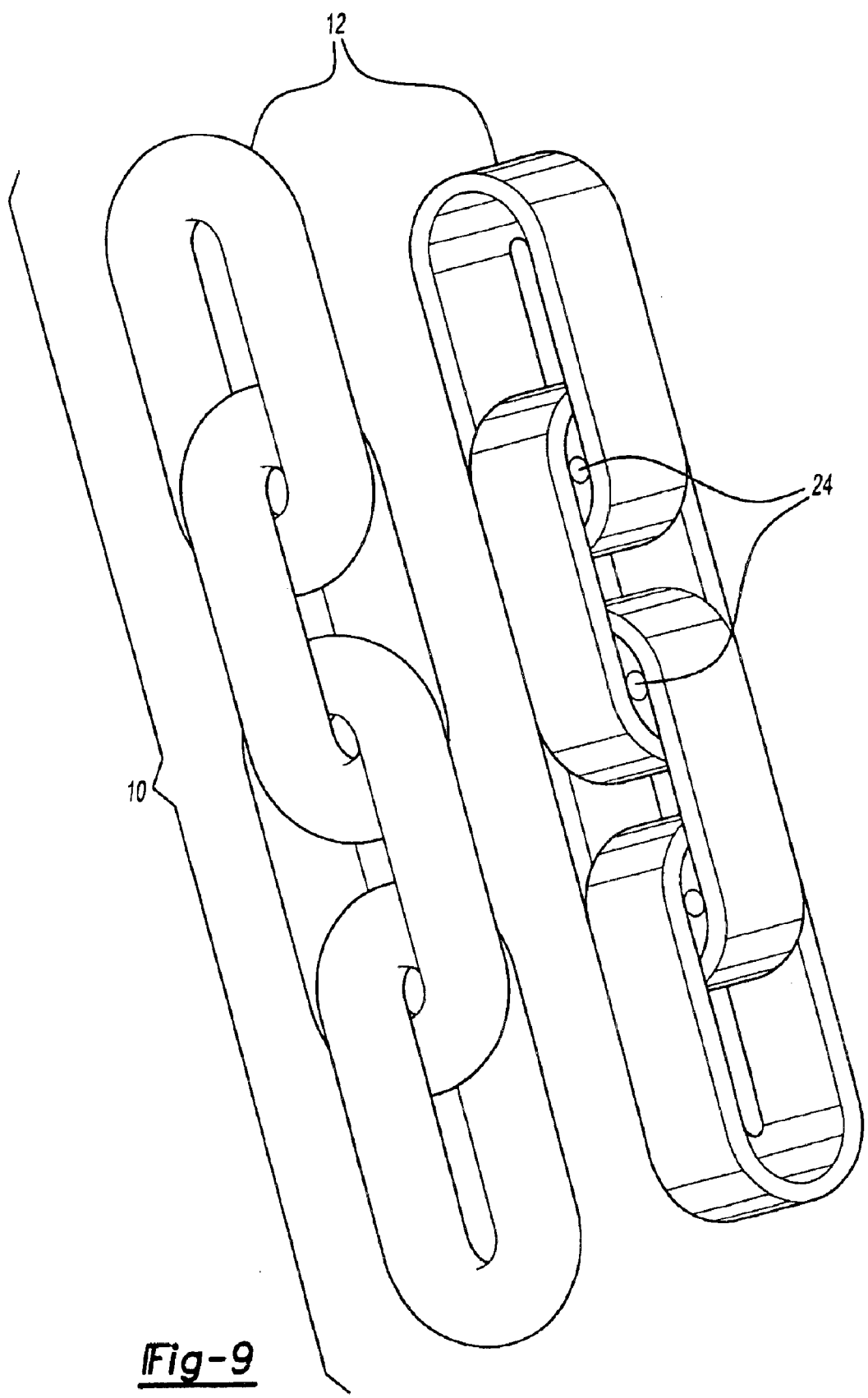
FIG. 9 is a perspective view of a an alternative embodiment of the modular segmented structural reinforcement system in accordance with the teachings of the present invention showing a plurality of modular segments held together by attachment means comprising a chain assembly which permits the flexing of at least one modular segment relative to one another for placement in either a hydroform or directly to portions of an automotive vehicle.

In addition, the present invention provides and discloses retention means for retaining the plurality of modular segmented members in position for placement directly within a selected cavity of an automotive vehicle. The retention means can consist of a number of alternative embodiments or assemblies that may be utilized as retention means for the plurality of modular segmented members. Namely, the retention means may comprise, but is not limited to: a traditional ball and socket assembly as shown in FIG. 7, a hitch-snap assembly as shown in FIG. 8, and a chain assembly as shown in FIG. 9.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

A number of advantages are realized in accordance with the present invention, including, but not limited to, the ability to manufacture a structural reinforcement system for use in a hydroform or other closed form for delivery and assembly at a vehicle assembly plant without the need for application of pumpable products, wet chemical products, and multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of reinforcing a structure of an automotive vehicle, comprising:
   providing a structure of an automotive vehicle, the structure having a plurality of walls defining a cavity;
   locating a plurality of modular segments within the cavity wherein the plurality of modular segments includes a first segment, a second segment and a third segment, both the first segment and the second segment having expandable material disposed upon outer surfaces thereof and wherein each of the second segment and the third segment, only after insertion within the cavity, engages another of the plurality of segments that is already within the cavity;
   activating the expandable material of the first segment to expand, contact and adhere to the second segment; and
   activating the expandable material of the second segment to expand, contact and adhere to the walls defining the cavity of the structure of the automotive vehicle.

2. A method as in claim 1 wherein each segment of the plurality of the segments is shaped to the contours of the cavity.

3. A method as in claim 1 wherein a singular retaining member is disposed through each of the plurality of segments during the locating step.

4. A method as in claim 1 wherein the third segment includes an annular outer surface upon which the expandable material is disposed.

5. A method as in claim 4 wherein the expandable material, upon expansion, adheres to the walls of the structure and forms the plurality of segments into a unitary structure.

6. A method as in claim 1 wherein said expandable material is an expandable foam that is generally free of tack to the touch.

7. A method as in claim 1 the structure being selected from a pillar, a rail or a combination thereof.

8. A method as in claim 1 wherein each segment of the plurality of segments includes a first portion and a second portion and the plurality of modular segments are maintained in an accordion-like state with the first portion of the first segment of the plurality of modular segments located at least partially within a cavity defined in the second portion of the second segment of the plurality of modular segments.

9. A method of reinforcing a structure of an automotive vehicle, comprising:
   providing a structure of an automotive vehicle, the structure having a plurality of walls defining a cavity;
   locating a first segment of a plurality of modular segments within the cavity;
   slideably engaging a second segment of the plurality of modular segments with the first segment of the plurality of modular segments, both the first segment and second segment having expandable material disposed upon their outer surfaces;
   activating the expandable material of the first segment to expand, contact and adhere to the second segment; and
   activating the expandable material of the second segment to expand, contact and adhere to the walls defining the cavity of the structure of the automotive vehicle;
   wherein a singular retaining member is disposed through each of the plurality of segments during the slideably engaging step.

10. A method as in claim 9 further comprising:
    slideably engaging a third segment of the plurality of modular segments with the second segment of the plurality of modular segments.

11. A method as in claim 9 wherein each segment of the plurality of the segments is shaped to the contours of the cavity.

12. A method as in claim 9 wherein the outer surfaces are annular and the expandable material, upon expansion, adheres to the walls of the structure and forms the plurality of segments into a unitary structure.

13. A method as in claim 9 wherein said expandable material is an expandable foam that is generally free of tack to the touch.

14. A method as in claim 9 wherein each segment of the plurality of segments includes a first portion and a second portion and the plurality of modular segments are maintained in an accordion-like state with the first portion of a first segment of the plurality of modular segments located at least partially within a cavity defined in the second portion of a second segment of the plurality of modular segments.

15. A method of reinforcing a structure of an automotive vehicle, comprising:
    providing a structure of an automotive vehicle, the structure having a plurality of walls defining a cavity;
    locating a first segment of a plurality of modular segments within the cavity;
    slideably engaging a second segment of the plurality of modular segments with the first segment of the plurality of modular segments, both the first segment and second segment having expandable material disposed upon their outer surfaces, wherein:
    i) the first segment of the plurality of segments flexibly nests with the second segment of the plurality of segments such that the first segment and second segment can make accordion motions relative to each other; and
    ii) each segment of the plurality of modular segments successively engages another of the plurality of modular segments, the plurality of modular segments including the first segment, the second segment and a third segment;
    activating the expandable material of the first segment to expand, contact and adhere to the second segment; and
    activating the expandable material of the second segment to expand, contact and adhere to the walls defining the cavity of the structure of the automotive vehicle.

16. A method as in claim 15 wherein each segment of the plurality of the segments is shaped to the contours of the cavity.

17. A method as in claim 15 wherein the structure is a hydroform tube.

18. A method as in claim 15 wherein the expandable material, upon expansion, adheres to the walls of the structure and forms the plurality of segments into a unitary structure.

19. A method as in claim 15 wherein said expandable material is an expandable foam that is generally free of tack to the touch.

* * * * *